(12) United States Patent
Chang et al.

(10) Patent No.: US 7,864,490 B2
(45) Date of Patent: Jan. 4, 2011

(54) CPP HEAD WITH PARASITIC SHUNTING REDUCTION

(75) Inventors: Jeiwei Chang, Cupertino, CA (US); Stuart Kao, Fremont, CA (US); Chao Peng Chen, Fremont, CA (US); Chunping Luo, Milpitas, CA (US); Kochan Ju, Monte Sereno, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 688 days.

(21) Appl. No.: 11/901,584

(22) Filed: Sep. 18, 2007

(65) Prior Publication Data
US 2008/0050615 A1    Feb. 28, 2008

Related U.S. Application Data

(62) Division of application No. 10/734,422, filed on Dec. 12, 2003, now Pat. No. 7,279,269.

(51) Int. Cl.
*G11B 5/33* (2006.01)
(52) U.S. Cl. .................................................. 360/324.1
(58) Field of Classification Search .............. 360/324.1, 360/324.11, 324.12
See application file for complete search history.

(56) References Cited

U.S. PATENT DOCUMENTS

| 5,627,704 | A | 5/1997 | Lederman et al. |
| 5,668,688 | A | 9/1997 | Dykes et al. |
| 6,294,101 | B1 | 9/2001 | Silverbrook |
| 6,496,334 | B1 | 12/2002 | Pang et al. |
| 6,643,107 | B1 * | 11/2003 | Hasegawa et al. ........ 360/324.1 |
| 7,022,383 | B2 * | 4/2006 | Li et al. ...................... 427/534 |

* cited by examiner

*Primary Examiner*—David D Davis
(74) *Attorney, Agent, or Firm*—Saile Ackerman LLC; Stephen B. Ackerman

(57) ABSTRACT

The series resistance of a CPP GMR stack can be reduced by shaping it into a small upper, on a somewhat larger, lower part. Because of the sub-micron dimensions involved, good alignment between these is normally difficult to achieve. The present invention discloses a self-alignment process based on first laying down a mask that will determine the shape of the top part. Ion beam etching is then initiated, the ion beam being initially applied from one side only at an angle to the surface normal. During etching, all material on the near side of the mask gets etched but, on the far side, only material that is outside the mask's shadow gets removed so, depending on the beam's angle, the size of the lower part is controlled and the upper part is precisely centrally aligned above it.

4 Claims, 3 Drawing Sheets

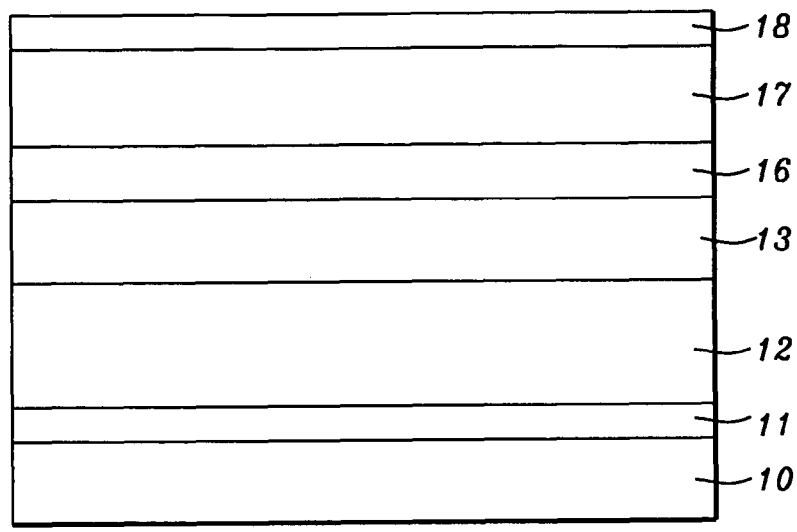
FIG. 1 – Prior Art
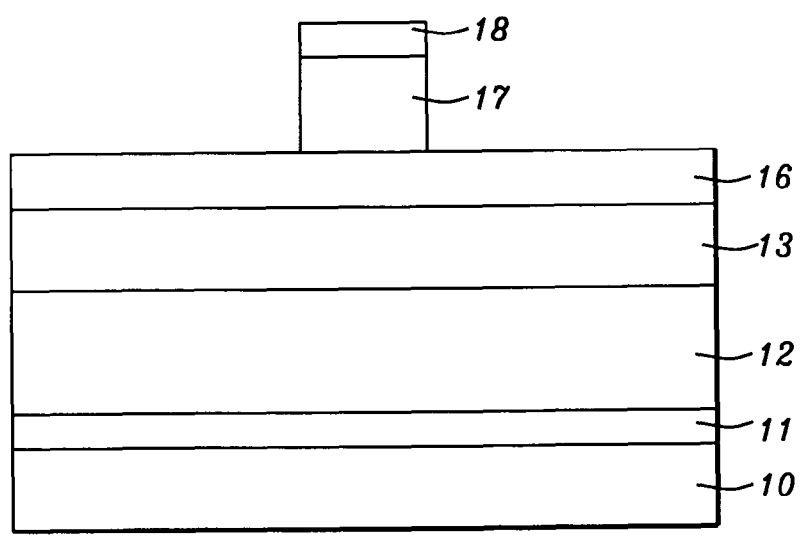
FIG. 2 – Prior Art

CPP HEAD WITH PARASITIC SHUNTING REDUCTION

This is a divisional application of U.S. patent application Ser. No. 10/734,422, filed on Dec. 12, 2003, now U.S. Pat. No. 7,279,269 which is herein incorporated by reference in its entirety, and assigned to a common assignee.

FIELD OF THE INVENTION

The invention relates to the general field of CPP magnetic read heads with particular reference to reducing series resistance thereof.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. On lower lead layer is seed layer 11 on which is antiferromagnetic layer 12 whose purpose is to act as a pinning agent for magnetically pinned layer 13. Next is a copper spacer layer 16 on which is low coercivity (free) ferromagnetic layer 17. Capping layer 18 lies atop free layer 17. When free layer 17 is exposed to an external magnetic field, the direction of its magnetization is free to rotate according to the direction of the external field. After the external field is removed, the magnetization of the free layer remains fixed.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8-20%.

Earlier GMR devices were designed so as to measure the resistance of the free layer for current flowing parallel to its two surfaces. However, as the quest for ever greater densities has progressed, devices that measure current flowing perpendicular to the plane (CPP) have begun to replace them. For CIP devices, the signal strength is diluted by parallel currents flowing through other layers whereas in a CPP device, the total transverse (series) resistance of all layers, other than the free layer, should be as low as possible.

It is known that AFM layer 12 together with high resistance seed layer 11 contribute most of the series resistance in a CPP-GMR structure. Although its functional unit (free/spacer/pinned layers) has a much higher GMR ratio, the entire CPP-GMR structure will have a low GMR ratio resulting from the large resistance of AFM/seed layer. Furthermore, the AFM/seed layers form hot spots that further limit the applied current density that can be employed.

In a related application (application Ser. No. 10/718,373 filed Nov. 20, 2003), the CPP structure illustrated in FIG. 2 was disclosed. As can be seen, the free and cap layers have been patterned to have a lower width than the remainder of the stack so the resulting resistance of such a structure is greatly reduced. A typical spacer material such as Cu has an electron spin diffusion length about 1500 Angstroms. Within this length, the spin directions of path-altered electrons remain unchanged so that $\Delta R$ can be maintained. The GMR ratio of the structure seen in FIG. 2 is increased due to the reduced series resistance and hot spots are also be eliminated, thereby allowing higher applied current density and increased signal.

To simplify the description, all the layers above the spacer layer are called the top CPP stack and the remaining layers are called the bottom CPP stack. Using conventional process techniques, this structure has been fabricated using two separate lithography/etching/lift-off sequences. The first step patterns the larger CPP bottom stack while the second step patterns the top CPP stack.

There are, however, several problems associated with this approach. To maximize the GMR ratio in the CPP structure shown in FIG. 2, both top and bottom CPP stacks must have sub-micron dimensions and they have to be precisely positioned. As the areal density increases, proper alignment at these continuously shrinking dimensions becomes very difficult. Furthermore, after the first lithography/etching/lift-off sequence, the etched CPP structure is exposed to the environment and is subjected to attack from moisture or chemicals.

The present invention discloses a novel method which will eliminate the above problems. This technique will also improve edge profiles while achieving small-dimension alignment so that the desired spin diffusion length can be obtained on both sides of a CPP GMR sensor.

A routine search of the prior art was performed with the following references of interest being found:

Pang et al., in U.S. Pat. No. 6,496,334, describe using IBE in etching the CPP stack. In U.S. Pat. No. 6,294,101, Silverbrook discloses IBE rotation during etching. Lederman et al (in U.S. Pat. No. 5,627,704) and Dykes et al. (in U.S. Pat. No. 5,668,688) are of interest as having to do with CPP fabrication, but do not mention the IBE etching of the present invention.

SUMMARY OF THE INVENTION

It has been an object of at least one embodiment of the present invention to provide a CPP GMR read head that has reduced series resistance.

Another object of at least one embodiment of the present invention has been to provide a process for manufacturing said read head.

Still another object of at least one embodiment of the present invention has been that said process be executed during a single pumpdown.

These objects have been achieved by dividing the GMR stack into upper and lower parts. The upper part is a pedestal that comprises the cap and free layers while the lower part, starting with the spacer layer, is a larger pedestal that contains all remaining layers.

Alignment between the two pedestals is exact because a self-aligning process is used. Additionally, the upper pedestal has sidewalls that are steeper than those of the lower pedestal. Self alignment is achieved by first laying down a mask that will determine the shape of the top part. Ion beam etching is then initiated, the ion beam being applied from one side only at an angle to the surface normal, with the wafer being rotated in its plane through an angle of up to 180°. After one or more such etch steps, the wafer is rotated 180° and the process is repeated. During etching, all material on the near side of the mask gets etched but, on the far side, only material that is outside the mask's shadow gets removed so, depending on the beam's angle, the size of the lower pedestal is controlled with the upper pedestal precisely aligned to be centrally located.

Because of the very small dimensions involved (upper pedestal has a maximum diameter of about 0.3 microns) precise alignment is very difficult to achieve in any other way.

BRIEF DESCRIPTION OF THE DRAWINGS

FIG. 1 shows a typical CPP GMR stack of the prior art.

FIG. 2 shows how series resistance in the structure of FIG. 1 can be reduced.

DESCRIPTION OF THE PREFERRED EMBODIMENTS

Figure 3:
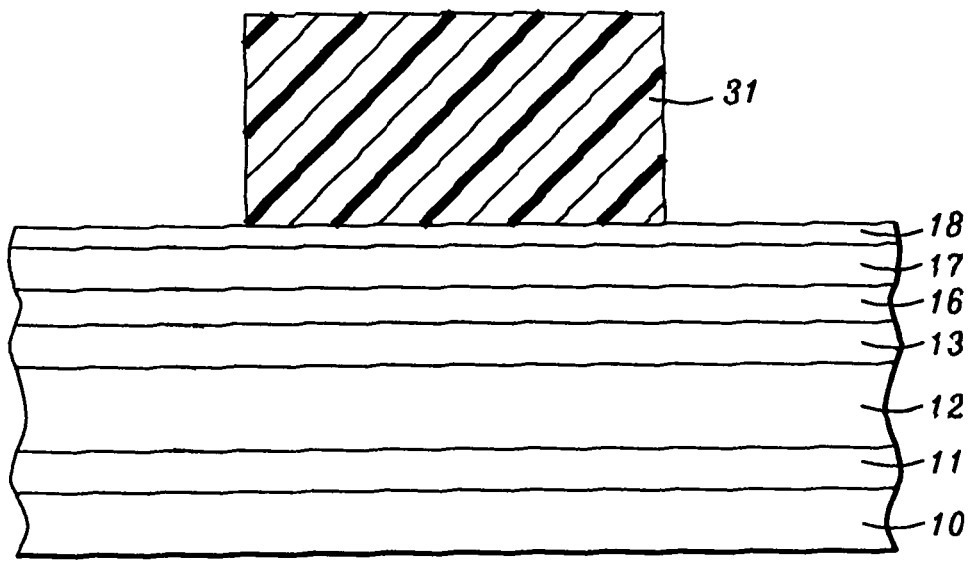
FIG. 3 shows the starting point for the process of the present invention.
Figure 4:
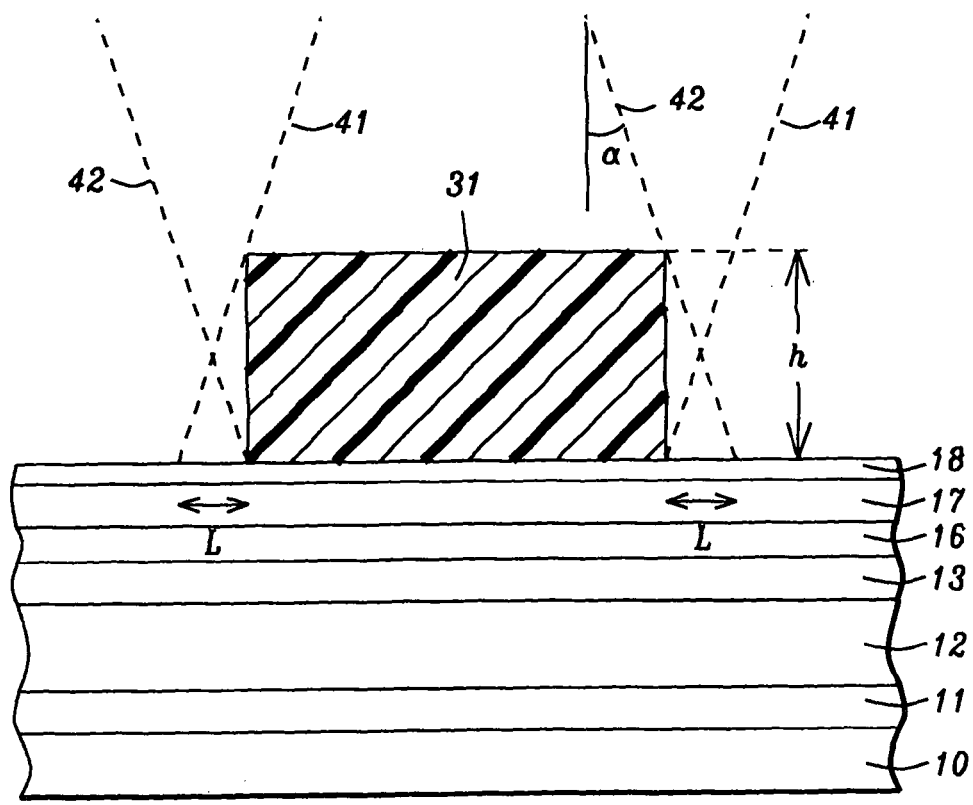
FIG. 4 illustrates how ion beam etching in the presence of a mask is performed from two different angles.

The process of the invention begins with the formation of mask 31 on the surface of capping layer 18 as seen in FIG. 3. The invention then employs ion beam etching (IBE) applied at two different angles, 41 and 42, (180 degree apart) to the wafer as shown in FIG. 4. During the first course of IBE, a wafer coated with a CPP GMR stack is etched from one side of a mask (typically, but not necessarily, photoresist). The area that is blocked by the resist shadow remains intact and only the area outside the resist shadow will be etched. To achieve uniform etching, the wafer is also rotated within a predefined arc during the IBE process (about an axis normal to its surface). This predefined arc can range between 3 and 180 degree: In the second IBE step, the orientation of the wafer is rotated 180 degrees and the preceding steps are repeated.

Figure 5:
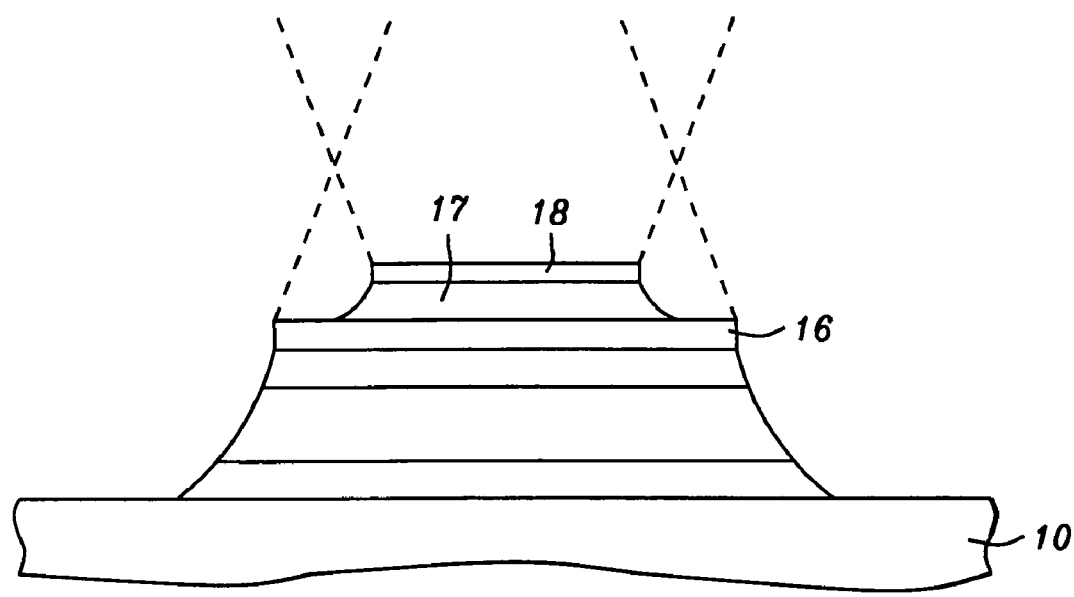
FIG. 5 illustrates the etch profile that results from ion beam etching according to the process of the present invention.

The mask shadowing effect controls the creation of the CPP bottom stack while the shape of the CPP top stack is determined by the mask pattern. This alternating cycle can be repeated several times to maintain the etching uniformity. The resulting etch profile is shown in FIG. 5 and will be discussed more fully below. The total etching time is controlled so that etching of the terrace adjacent to the resist is stopped at the surface of the spacer layer. The mask can be either a single layer or a multi-layer, the latter being preferred because it is more effective for use in a liftoff process (see below).

The thickness range of the mask is from 0.1 μm and up so long as said thickness does not affect the capability of achieving a desired critical dimension. However, the minimum image layer resist thickness must be large enough to sustain the ion bombardment so that the critical dimension can be maintained during IBE process. If necessary, the mask could be a hard mask made of a material such as alumina that is known to have a low sputtering yield (along with an underlayer to support liftoff later).

Since the process of the invention utilizes the resist shadowing effect to create the top and bottom CPP stacks, it is self-aligning (between top and bottom CPP stacks) and requires only one lithography step. Terraces on both sides of the resist can have an equal length that is controlled by the beam angle and the thickness of the photoresist. In FIG. 4, the terrace length (L) that is adjacent to the resist pattern is determined by incident beam angle ($\alpha$) and resist height (h) given in Equation (1)

$$L = h \times \tan \alpha \alpha \qquad (1)$$

Because the wafer is side-etched twice, with a 180° rotation in between, the beam angles for both sides are maintained at the same value with respect to the wafer surface normal.

Continuous wafer rotation is commonly used during an IBE process in order to achieve good etching uniformity. However, during wafer rotation the resist shadowing effect results in a tapered edge profile on the etched layer. This tapered edge profile is undesirable if a bias layer (exchange or hard bias) is used to provide horizontal stabilization. In this invention, the IBE process is conducted one side at a time so the CPP top stack is exposed to the incident ion beam without any blockage from photoresist. As a result, a more vertical edge profile can be achieved.

Both slopes are shaped by alternately rotating the wafer (or ion beam or both) from −C through 0 to +C degrees. During this relative motion between the wafer and the beam, the beam angle (relative to the wafer normal) is varied from −A, through B (a fixed angular value) to +A according to the following relationship:

$$A = B + \tan^{-1}[(\tan B)/\cos C] \qquad (2)$$

Typically, A has a maximum value of up to about 90 degrees and fixed angle B has a value between about 5 and 45 degrees while C can range from a low of about 3 degrees to a maximum of 180 degrees.

The difference in steepness between the inner and outer slopes originates from shadowing effects (no shadowing effect on the inner slope). Both inner and outer slopes can be calculated based on exactly the same angular oscillation except the shadowing effect needs to be included in the calculation of the outer slope. Such a relationship between inner and outer slopes can be used for usage verification of our method.

The disclosed method is to utilize symmetric 180° rotation. Such rotation results in an equal terrace length for each side of a reader sensor, as seen in FIG. 5. Even terrace length on both sides of a reader sensor is another signature of our approach.

Figure 6:
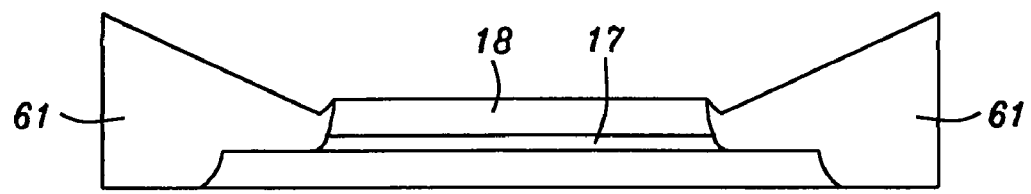
FIGS. 6 and 7 show the application of a top lead to the structure.

Thus, the oscillating ion beam of the present invention ensures etching uniformity. After the IBE process, insulating layer 61 such as alumina, silica, or aluminum nitride is then deposited, followed by the lift-off process (FIG. 6). Since this invention employs a self-aligned process that requires only one lithography step, the etching and deposition processes can be done within a single (clustered IBE and IBD) system. This eliminates any risk of exposing the freshly etched CPP stack to the moisture and chemicals from the environment before the second lithography/etching cycle is completed. Furthermore, it is known that the photoresist developer will dissolve oxide formed on the metal layer surface. Any loss or contamination of material on the CPP layers will increase the complexity of the subsequent process and reduce the etching precision.

Typically the pedestals that comprise the top and lower CPP stacks have width ratios between about 1 and 12 and the top CPP stack has an aspect ratio between about 1.5 and 30 as well as a maximum width of between about 0.05 and 0.3 microns while the lower CPP stack has a maximum width of between about 0.05 and 0.6 microns. The top CPP stack has a thickness between about 100 and 300 Angstroms and the lower CPP stack a thickness also between about 100 and 300 Angstroms. The dimensions listed above imply a process that requires precise control of the etching end point. Reduction to a single lithography/etching/lift-off cycle will greatly increases the layer precision.

Figure 7:
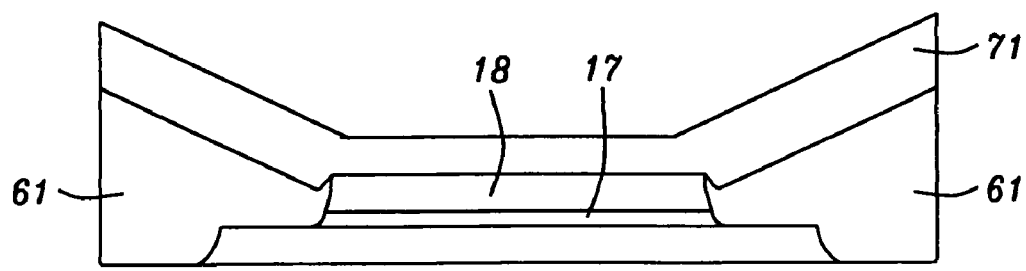

After the lift-off process, thick metal layer 71, to form the upper conducting lead, is overlaid on the patterned CPP GMR, as shown in FIG. 7, to complete the device. The resulting read head has a GMR ratio of at least 1% and a series resistance that is less than about 50 ohms.

What is claimed is:

1. A CPP magnetic read head, comprising:
    a seed layer on a lower lead layer;
    an antiferromagnetic layer on said seed layer;
    a pinned layer on said antiferromagnetic layer;
    a spacer layer on said pinned layer;
    a free layer on said spacer layer;
    a cap layer on said free layer;
    said cap layer and said free layer together forming a first pedestal having a first maximum width;
    said seed layer, said antiferromagnetic layer, said pinned layer, and said spacer layer together forming a second pedestal having a second maximum width that is greater than said first maximum width;
    said first pedestal being precisely aligned relative to said second pedestal whereby said second pedestal overlaps said first pedestal by the same amount everywhere; and
    said first pedestal having sidewalls that are steeper than those of said second pedestal.

2. The CPP read head described in claim 1 wherein said read head has a GMR ratio of at least 1% and a series resistance that is less than about 50 ohms.

3. The CPP read head described in claim 1 wherein said second maximum pedestal width is between about 1 and 12 times said first maximum pedestal width.

4. The CPP read head described in claim 1 wherein said first pedestal has an aspect ratio between about 1.5 and 30.

* * * * *